No. 705,729. Patented July 29, 1902.
G. A. WILLIAMS & J. O. McCALL.
STOCK GUARD FOR RAILROADS.
(Application filed Oct. 9, 1901.)
(No Model.)
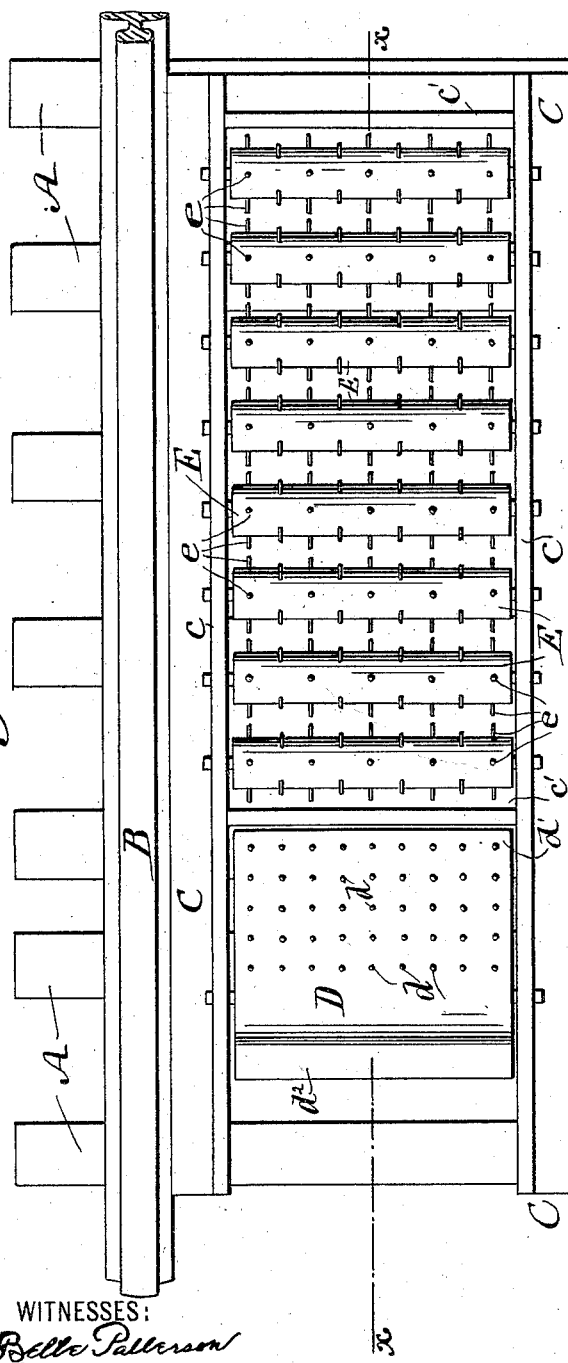
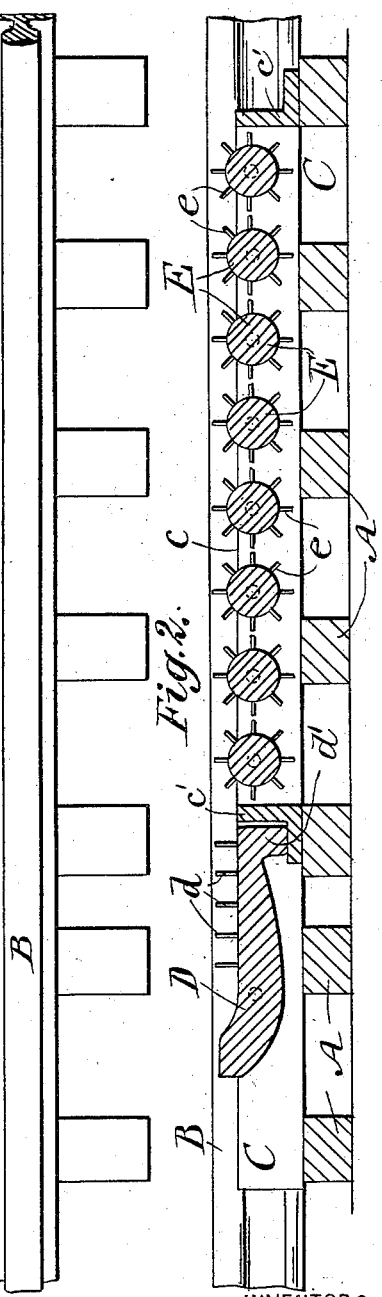
WITNESSES:
Belle Patterson
Sophia Harnisch
INVENTORS
G. A. Williams
and
James O. McCall
BY
ATTORNEYS

UNITED STATES PATENT OFFICE.

GEORGE ALBERT WILLIAMS AND JAMES ORR McCALL, OF DOUGHERTY, INDIAN TERRITORY.

STOCK-GUARD FOR RAILROADS.

SPECIFICATION forming part of Letters Patent No. 705,729, dated July 29, 1902.

Application filed October 9, 1901. Serial No. 78,037. (No model.)

*To all whom it may concern:*

Be it known that we, GEORGE ALBERT WILLIAMS and JAMES ORR McCALL, citizens of the United States, and residents of Dougherty, Chickasaw Nation, Indian Territory, have invented certain new and useful Improvements in Stock-Guards for Railroads, of which the following is a specification, reference being had to the accompanying drawings, forming a part thereof, in which similar letters of reference indicate corresponding parts in both figures.

This invention relates to stock-guards for railroads, the object thereof being to provide an efficient device of this character which will act as a bar or guard to prevent cattle and other live stock from entering the railroad.

A further object is to provide a device which will in no way interfere with railway traffic and which is durable, continuously operative, and inexpensive.

The nature of the invention will be fully understood from the following general description and the annexed drawings and will be subsequently pointed out in the claims.

Figure 1 of the accompanying drawings is a plan view of a part of a railroad-track with our invention placed in operative position. Fig. 2 is a vertical section of the same, taken on the line $x$ $x$ of Fig. 1.

In the accompanying drawings, A designates the cross-ties, and B the rails, of a railroad-track at one side of the place where it crosses a street or road. Between the rails B and B and adjoining the said road is securely laid the frame C, which is of rectangular shape and is formed with the sides $c$ $c$ and ends $c'$. This frame must be of sufficient strength to carry the mechanism mounted in it, as hereinafter described. In this frame C is pivotally mounted the plate D of the form illustrated, so that the weight of the end $d'$ thereof will hold said plate normally in the position illustrated in section in Fig. 2. In this plate at the end $d'$ and adjacent thereto are fastened a plurality of sharp spikes, (designated by $d$.) This plate is placed in the end of the frame C nearest to the road, with the end $d'$ of the plate away from the road. In this frame C are also mounted a plurality of revoluble rollers, (designated by E.) In each of these rollers is fixed a plurality of radial spikes, (designated by $e$.)

The use and operation of our invention are as follows: When a cow or horse or other animal attempts to walk on the track of the railroad, its feet will first come on the end $d^2$ of the plate D. The weight of the animal thus brought upon that end of the plate will cause it, by reason of its pivoted mounting, to sink suddenly down. As the end $d^2$ goes down the end $d'$ will spring up and bring the spikes $d$ into sharp contact with the legs and breast of the animal, and so drive it back off the track. As soon as the animal has stepped off the end $d^2$ the weight of the end $d'$ will restore the plate to its normal position. If, however, the animal should by any chance pass the plate D, it will come at once upon the spiked revolving rollers E. Finding these impossible to pass, the animal will hastily return back off the track, so that in either case the animal will be effectually prevented from walking on the track. If there be more than one track, a similar frame and its accompanying mechanism should be laid in each track and between the tracks, and in any case a similar frame should be laid close to and outside of a single track on each side and outside of each of the outer tracks where there are more than one. Thus the spaces inside of the track and outside of the track will both be protected by a proper guard.

Having now fully described our invention and how the same is constructed and used, what we claim, and desire to secure by Letters Patent, is—

1. The combination with a railroad-track; of a stock-guard, comprising frames, spiked plates pivoted in said frames, and spiked, revoluble rollers mounted in said frames, and all adapted to be laid in and by said railroad-track; all substantially as and for the purpose set forth.

2. In a stock-guard, for railroads, the combination with frames, adapted to be laid in and by a railroad-track; of plates pivoted in said frames, and a plurality of revoluble rollers mounted in said frames; all substantially as and for the purpose set forth.

3. In a stock-guard for railroads, the combination with supporting-frames, adapted to be laid in and by a railroad-track; of plates having on their surfaces a plurality of spikes, and pivoted in said frames and a plurality of revoluble rollers, having each on its surface a plurality of spikes, and mounted in said frames; all substantially as and for the purpose set forth.

4. In a stock-guard for railroads, the combination, with supporting-frames, adapted to be laid in and by a railroad-track; of spiked plates in said frames; said plates connected to the frames by pivots in front of their centers of gravity so that the weight of said plates will hold them in normal position; and a plurality of spiked rollers also mounted in said frames, all substantially as and for the purpose set forth.

In testimony that we claim the foregoing as our invention we have signed our names, in the presence of two witnesses, this 2d day of September, 1901.

GEORGE ALBERT WILLIAMS.
JAMES ORR McCALL.

Witnesses:
B. H. BARKER,
W. C. MORGAN.